United States Patent [19]
Schier

[11] 3,821,061
[45] June 28, 1974

[54] SERVING UTENSIL FOR FRUITS

[76] Inventor: Robert W. Schier, 1828 Wagner Rd., Glenview, Ill. 60025

[22] Filed: Aug. 4, 1972

[21] Appl. No.: 278,111

[52] U.S. Cl.................... 161/42, 161/110, 206/72, 220/1, 220/70
[51] Int. Cl............................ B32b 3/02, B65d 1/34
[58] Field of Search............ 161/42, 110; 220/1, 70; 206/72

[56] References Cited
UNITED STATES PATENTS

| | | | |
|---|---|---|---|
| 1,858,247 | 5/1932 | Milliron et al. | 220/1 R |
| 2,258,716 | 10/1941 | Ralph et al. | 206/72 X |
| 2,469,777 | 5/1949 | Mohun | 206/72 |
| 3,009,599 | 11/1961 | Schier et al. | 220/1 R |

*Primary Examiner*—Philip Dier
*Attorney, Agent, or Firm*—Johnston, Keil, Thompson & Shurtleff

[57] ABSTRACT

A serving utensil for fruits, especially melons and citrus fruits such as grapefruit and oranges, characterized by a concave base or portion having a rounded rim and a plurality of sharply-pointed rind or skin penetrating, fruit gripping members on supports extending upwardly from the concave portion, the pointed members being near to and above the rim.

11 Claims, 11 Drawing Figures

PATENTED JUN 28 1974
3,821,061
SHEET 1 OF 2
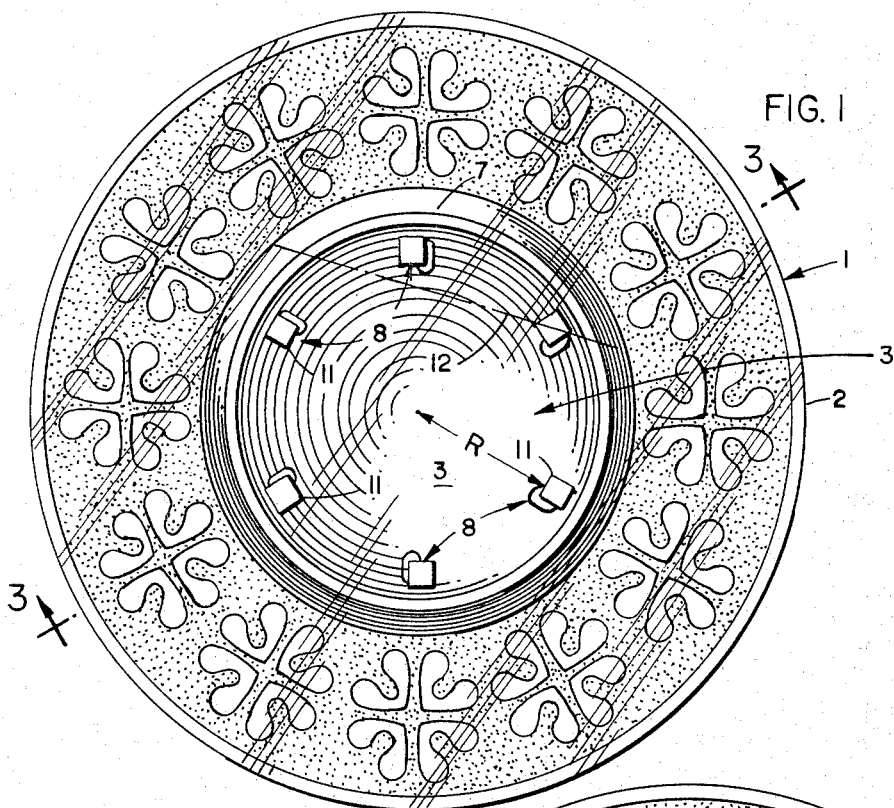
FIG. 1
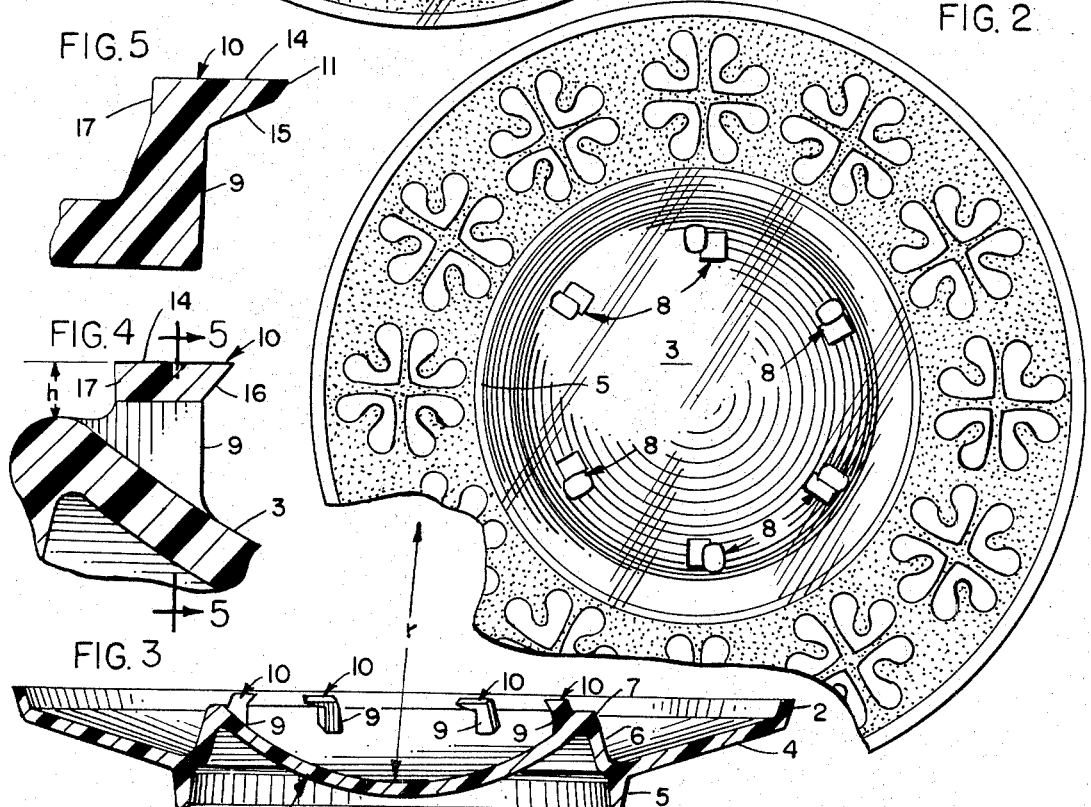
FIG. 2
FIG. 5
FIG. 4
FIG. 3

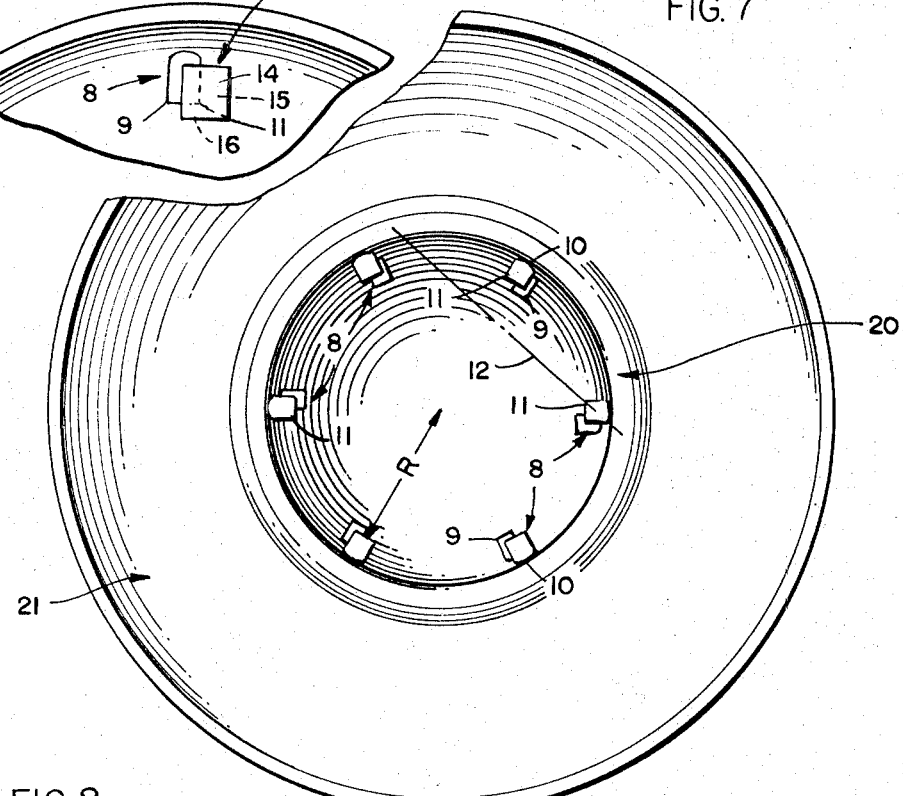

SERVING UTENSIL FOR FRUITS

BACKGROUND

In U.S. Pat. No. 3,009,599 there is described a serving dish for citrus fruits such as melons, grapefruit and oranges having a central ring-like base and a concave supporting pad within the ring to which the fruit may be anchored. The height of the sides of the dish adjacent the pad and the height of the pad are so interrelated that large diameter fruit which normally extends beyond the sides of the dish when placed on the pad will clear the rim. In this type of dish there are skin-penetrating, hook-like prongs which may take the form of tongues punched out of the pad, and lying close to the concave surface. This invention relates to improvements for anchoring the fruit on the fruit-serving utensil, especially when the fruit is of non-uniform roundness, and for more secure gripping of the fruit, regardless of the roundness characteristics thereof.

OBJECTS

An object of the present invention is to provide new and improved utensils for serving fruits, particularly oranges and grapefruit, in which the fruit can be anchored securely, regardless of its roundness uniformity.

Another object of the invention is to provide a serving utensil of the type described, in which the fruit is held securely while spooning out the edible portions thereof.

Still a further object of the invention is to provide new and improved serving utensils which can be readily molded from plastics in whole or in part or from ceramics.

BRIEF SUMMARY OF THE INVENTION

In accordance with several embodiments of the invention, a serving utensil for citrus fruits comprises a shallow dish having an outwardly flaring rim wall and a central concave re-entrant portion with a plurality of sharply pointed, preferably essentially flat surfaced, fruit-gripping members mounted on supports extending upwardly from said re-entrant portion near its rim, the points of said members lying above the rim and preferably the same plane, and adapted to support the fruit in or above said concave re-entrant portion. The sharp points of said flat surfaced members penetrate only the rind or skin of the fruit when it is rotated against said points.

When in the form of a fruit-serving dish of the type aforesaid, the entire dish comprising the central, fruit-gripping portion and the rim portion of the dish may be a unitary molding or casting, preferably a thermoplastic or thermosetting, moldable, synthetic polymer or resin, or a ceramic material. Alternatively, the central portion which grips the fruit may be made as a separate piece in the form of a molding or casting as aforesaid, which central portion is then removably or fixedly mounted on a central boss on the rim portion of a serving dish. The latter piece may be made of thermoplastic or thermosetting, moldable synthetic polymer or resin, metal, glass, porcelain or other ceramic material or the like.

In still another form of the invention, the fruit-gripping portion of the serving utensil is a cast or molded polymer or resin as aforesaid having a downwardly extending boss in which is mounted the stem of a serving piece. Such stem and its base are much like those of goblets, sherbet glasses, or like serving pieces.

For the purpose of the invention it is most advantageous to have the points of the fruit-gripping members above the rim of the concave re-entrant portion. Such arrangement enhances secure gripping of virtually all sizes and roundnesses of citrus and melon fruits.

THE DRAWINGS

Other objects and advantages of the invention will appear from the following description in conjunction with the accompanying drawings in which FIG. 1 represents a top plan view of a first embodiment of a fruit-serving utensil in accordance with the invention;

FIG. 2 is a bottom view of the utensil shown in FIG. 1;

FIG. 3 is a vertical sectional view taken along the section plane 3—3 of FIG. 1;

FIG. 4 is an enlarged view partly in section of a portion of the utensil shown in FIGS. 1, 2 and 3;

FIG. 5 is a sectional view taken through the section plane 5—5 of FIG. 4;

FIG. 6 is an enlarged, top plan view of a fragment of the utensil of FIGS. 1–5 and one of the fruit-gripping members thereon;

FIG. 7 is a top plan view of a second embodiment of the invention wherein the fruit-gripping, central portion of a fruit-serving utensil is a separate piece mounted on a boss in a dished rim portion of the fruit-serving utensil;

FIGS. 8 and 9 respectively are diametric sections of the embodiment of FIG. 7 and respectively illustrate screw thread and friction or adhesive mounting of the fruit-gripping central portion on the respective rim portions;

FIG. 10 is a top plan view of a third embodiment of the invention and constitutes a fruit-gripping member mounted on a stem to provide the serving utensil; and FIG. 11 is an exploded, fragmentary, section view taken on section plane 11—11 of FIG. 10.

Detailed Description of the Invention

In the drawings, FIG. 1 shows a dish generally indicated at 1 having an outer rim 2 and a central concave re-entrant portion 3 which is connected to the outer rim 2 by flaring a frusto-conical wall 4 to form the rim portion of the dish. (see FIG. 3). The base 5 of the dish is formed in the shape of a ring. The outer, side wall 6 of the re-entrant portion is a frusto-conical ring rim 7 which preferably is rounded on its top edge. Six fruit-gripping members 8 are integrally molded or otherwise secured to the upper surface of the concave reentrant portion 3 near, but inwardly of, the rim 7, and consist of support legs 9 which extend upwardly from said re-entrant portion near its rim. The legs have integral penetration and gripping heads 10.

In the embodiments shown in the drawings, the dish is made of a thermoplastic polymer which is either transparent or translucent. The entire dish, including the supporting members 8, can be integrally molded from a synthetic polymer or from a ceramic material. While the central re-entrant portion of the dish is circular in order to accommodate citrus fruits such as grapefruit, it can be constructed in different configurations to accommodate other types of fruits such as melons. Likewise, the rim portion of the dish, while shown as circular in the drawings, can have other configurations such as oval or polygonal without departing from the invention.

The fruit-penetrating and gripping heads 10 have a relatively sharp point 11 pointing in the line of a chord 12 relative to the circular rim 7 of the concave re-entrant portion 3. The sharp point 11 may point more tangentially, if desired, or even tangentially to an imaginary circle through the respective points 11. The point 11 is formed by the intersection of three planes of the fruit-gripping head forming a three-sided pyramid tip, preferably a right, three-sided pyramid tip. These sides are respectively designated in FIGS. 4, 5 and 6 as sides 14, 15 and 16. The upper side 14 preferably is in a plane parallel with the plane of the rim 7, while the sides 15 and 16 overhang in two directions from the leg 9 (FIG. 6) and slope diagonally upwardly and taper to the point 11. Such geometric configuration and orientation of the points 11 causes the fruit-penetrating members to bite into the rind or skin of the fruit as it is pressed downwardly against the projections and rotated toward the points 11, i.e., in a clockwise direction, as viewed in FIGS. 1, 7 and 10.

The heads of the fruit-gripping members 8 further have a substantially vertical, slight back draft of surface 17 (FIGS. 4 and 5). The surface provided by such back draft surface aids in holding the fruit on the projections after they have penetrated the rind or skin by virtue of abutment of the surface 17 against the edges of the slits in the rind or skin made by the penetrating members.

The embodiment of FIGS. 7, 8 and 9 also is a fruit-serving utensil wherein, instead of being a unitary or one piece construction, the serving utensil is a two piece construction. The two pieces comprise a central portion 20 and an outer or rim portion 21. The center portion 20 preferably is made of a molded or cast thermosetting or thermoplastic polymer or resin as aforedescribed and is similar in configuration to the central portion 3 of the serving dish of the embodiment of FIGS. 1–5. Where applicable, like numerals designate like parts.

The outer or rim portion 21 may be made of a material different from that of the center portion 20. It may be a molded thermoplastic or thermosetting polymer or resin, glass such as pyrex glass, a ceramic glass known under the trademark Pyroceram, ceramic such as porcelain, Corning Ware, or the like, or metal such as stainless steel, sterling silver, gold or silver plate and the like.

In the embodiment of FIG. 8, the rim portion 21 has a central, hollow boss 22 having thereon coarse male threads 23. The boss 22 may taper as shown in FIG. 8 or may be cylindrical. The central portion 20 has a matingly flaring rim 24, the inner surface of which has mating, coarse, female threads.

This two piece arrangement has several advantages. First, the two parts may be manufactured separately out of different materials, whereby a wide variety of combinations is possible, particularly for use in the institutional trade. Second, the two parts may be separated for cleaning purposes. Third, when so separated, the rim portions 21 will stack very readily in that the respective bosses 22 nest inside of the ring base 5.

The embodiment of FIG. 9 is similar in most respects to that of FIG. 8. Here, however, the central, hollow boss 22a and the rim 23a are not threaded. The two pieces may be press fitted, but more preferably are fixedly joined at their respective inner faces 25 by a suitable, heat-resistant, water-resistant adhesive, such as epoxy adhesive. Both embodiments (FIGS. 8 and 9) provide joints which avoid penetration of fruit juices into the joint.

The embodiment of FIGS. 10 and 11 uses a fruit-gripping member 26 similar in most respects to the central portion 20 of the embodiments of FIGS. 7–9. The principal differences are, in the case of FIGS. 10 and 11, a beaded rim 27 and a coaxial, downwardly facing boss 28 extending downwardly from the concave portion 3. The boss 28 receives the upper end 29 of a stem made of glass, cast or molded thermosetting or thermoplastic polymer or resin, metal or the like. The stem 30 is of any suitable length and may have an integral ring 31. The stem has at its bottom end a pedestal or base 32.

The invention makes it possible to provide a dish for citrus fruits such as grapefruit and oranges in which the fruit can be firmly anchored without difficulty, even though it is non-uniform in shape or texture.

It will be recognized that the invention is susceptible to some modification and variation. For example, while it is preferable to use six supporting and anchoring members 8 spaced 60° apart as shown in the drawings, a greater or smaller number can be used so long as they provide adequate support and normally at least three supporting and anchoring members are required.

There are several dimensions which, if observed, enhance the gripping of halves of oranges or grapefruit, or halves or even quarters of melons, placed upon the serving utensils herein described, regardless of their size and/or lack of roundness. First, the radius R from a vertical line through the center of the central portion to the inner edges of the fruit-gripping heads 10 should be in the approximate range of seven-eighths inch to 1⅛ inches, preferably about 1 inch. Second, the radius of curvature r of the spherical surface of the central re-entrant portion 3, should be in the range of 1¾ to 3 inches, preferably about 2 inches. Third, the height or vertical distance $h$ between the plane of the top of the rim 7 of the re-entrant portion 3 and a plane through the points 11 on the top surfaces of the fruit-gripping members 8 should be in the approximate range of 0.062–0.125 inch, preferably 0.080–0.100 inch.

With these dimensions, the heads 10 of the fruit-gripping members penetrate only the rind of citrus fruits or melons, even the thin rind or skin varieties thereof. Penetration through the rind is not desirable, because substances of the rind tend to affect adversely the flavor of the edible portions of oranges and grapefruit in particular. As the heads 10 penetrate the rind, the surfaces 15 and 16 and downward pressure by the person placing the half or quarter of the fruit on the serving utensil bring the rind or skin into contact with the rim 7, thereby firmly seating the fruit on the utensil. The fruit, depending on its size, may also rest on the spherical surface of the re-entrant portion 3, but normally it does not rest on this surface.

The overhang of the heads 10 in two directions relative to their support legs 9 provides, by virtue of the overhanging downwardly facing sides 15 and 16, relatively horizontal downwardly facing, fruit-gripping surfaces which bear against the rind or skin to prevent displacement of the gripping members 8 when a spoon is pressed into the fruit half or quarter. The spoon's pressure exerts a torque action, tending to rotate the fruit in a vertical plane. Further, while preferred, the planar and horizontal orientation of the respective sides 14 of the heads 10 may be of other configuration, e.g., arched, pitched, etc., as long as the points 11 are maintained.

Other changes or modifications within the scope and spirit of the invention defined in the appended claims will be apparent to those skilled in the art.

The invention is hereby claimed as follows:

1. A serving utensil for citrus fruits comprising a concave member having a circular rim, horizontally pointed, rind-penetrating heads on legs extending upwardly from said concave member near said rim, and the points of said heads being above the circular rim, being oriented so that said heads will penetrate the rind or skin of fruit when the latter is placed on said heads and rotated against said points.

2. A serving utensil as claimed in claim 1, said heads having three-sided pyramidal tip portions providing said points on said heads.

3. A serving utensil as claimed in claim 2, wherein said tip portions lie in a circle and the points of respective tip portions point along respective chords of said circle.

4. A serving utensil as claimed in claim 1, wherein said points lie in a circle and said points point along respective chords of said circle.

5. A serving utensil as claimed in claim 1, wherein said heads overhang in two directions from the respective legs, the overhanging portions providing downwardly facing, fruit-gripping surfaces.

6. A serving utensil as claimed in claim 1, wherein the top surfaces of said heads are 0.062 to 0.125 inch above the plane of the top edge of said rim.

7. A serving utensil as claimed in claim 6, wherein the distance from the center of said concave member to the inside edges of respective heads is seven-eighths inch to 1⅛ inches.

8. A serving utensil as claimed in claim 7, said concave member being spherically concave with a radius of curvature of 1¾ to 3 inches.

9. A serving utensil as claimed in claim 1, and further embodying a dish-shaped rim portion having a central upwardly projecting boss, and said concave member being mounted on said boss.

10. A serving utensil as claimed in claim 1, and said concave member being supported on a vertical stem having a base.

11. A serving dish as claimed in claim 1, and a dish-shaped rim portion about said concave member.

* * * * *